United States Patent [19]
Geer

[11] Patent Number: 5,583,759
[45] Date of Patent: Dec. 10, 1996

[54] MECHANISM FOR EXPEDITING THE DEPOSIT, TRANSPORT AND SUBMISSION OF CHECKS INTO THE PAYMENT SYSTEM

[75] Inventor: Terry L. Geer, Baltimore, Ohio

[73] Assignee: Huntington Bancshares, Inc., Columbus, Ohio

[21] Appl. No.: 507,856

[22] Filed: Jul. 27, 1995

Related U.S. Application Data

[63] Continuation of Ser. No. 156,190, Nov. 22, 1993, abandoned.
[51] Int. Cl.$^6$ ................................................ G06F 17/00
[52] U.S. Cl. ................................ 395/245; 395/230
[58] Field of Search ............................ 364/401, 406, 364/408

[56] References Cited

U.S. PATENT DOCUMENTS 5,175,682  12/1992  Higashiyama et al. ............. 364/408
5,198,975  3/1993  Baker et al. ............................ 364/406

Primary Examiner—Gail O. Hayes
Assistant Examiner—Steven R. Yount
Attorney, Agent, or Firm—Porter, Wright, Morris & Arthur

[57] ABSTRACT

A mechanism and process for effecting the expedited deposit, settlement and submission into the payment system for collection of funds represented by tangible financial instruments that are received by a payee at a location remote from the payee's collecting and clearing bank in which the instruments are sorted at a first location where indorsements on behalf of the payee and the collecting and clearing bank are applied, cash letters are prepared according to predetermined criteria, the sorted instruments and the cash letters are delivered into the check payment system and the checks' deposit with the collecting and clearing bank is coordinated with the timing of a settlement of accounts in the check payment system.

16 Claims, 2 Drawing Sheets

5,583,759

MECHANISM FOR EXPEDITING THE DEPOSIT, TRANSPORT AND SUBMISSION OF CHECKS INTO THE PAYMENT SYSTEM

RELATED APPLICATIONS

This is a continuation of Application for U.S. patent Ser. No. 08/156,190 filed on Nov. 22, 1993 now abandoned, having the common inventor and assignee of the present invention and incorporated herein by reference for all purposes.

BACKGROUND OF THE INVENTION

This invention relates to a system for the coordination of the physical transport of financial instruments with the electronic processing of a deposit by the payee of the instrument into a collecting and clearing bank. The instruments are prepared for submission into the check payment system. The deposit and collection of funds represented by the financial instruments is expedited. The financial instruments are checks and other cash items.

In the prior art, the deposit and payment of a check tendered for an amount due is effected in accordance with well established traditional procedures. The drawer (the check writer) establishes a checking account containing funds with a bank. A check is written against the drawer's account in favor of the payee. The payee indorses the check and deposits the check in the payee's account at the bank of first deposit for collection. That bank handling the payee's account and the deposited check presents the check through the check payment system to the drawer's bank for payment. This bank in turn debits funds from the drawer's account, and typically archives the check or a copy of the check and/or returns the physical check to the payor, and the cycle is thus completed. In the sequence of check handling, a check transferee remits, or is responsible for, the funds represented by the check to its transferor if the check is honored by the drawee.

The multiple steps in the process and the physical handling of checks involve a period of "float" time for the funds represented by the check. Recent banking regulations have shortened the traditionally permitted times for check processing and collection.

The receipt of 10,000 to 1,000,000 or more checks drawn on numerous different banks is not unusual for many large businesses such as credit card issuers, utilities, mail order processors, and other large commercial entities. In situations where large numbers of checks are involved, the handling of individual checks and effecting their posting, deposit and clearing is a complex multiple step process.

Thus there exists a need for a system whereby the conventional deposit and collection of funds represented by a check or other financial instrument may be simplified and expedited, particularly for large business institutions such as public utilities, mail order processors, and the like which receive large numbers of checks on a regular basis.

It is an object of this invention to provide such an expedited check deposit and collection mechanism and to reduce the amount, complexities and requirements for physical transport of financial instruments. It is a further object to eliminate duplicative data capture steps and multiple handling involved in the payee's and the bank of first deposit's handling of the same instrument.

SUMMARY OF THE INVENTION

The foregoing objectives are achieved in an integrated system for effecting the deposit, settlement and submission of financial instruments into the payment system for collection of funds. The financial instruments received by a payee at a location remote from the payee's collecting and clearing bank are presented for payment to the multiple institutions on which the instruments are drawn. A sorter at a first location established by the payee receives the financial instruments and sorts the instruments according to the predetermined sort pattern categories determined by the payee's collecting and clearing bank. Indorsements on behalf of the payee and the collecting and clearing bank with respect to each instrument received are applied to each instrument by a printer. The sorter further assembles the sorted instruments into discrete groups with respect to the predetermined sort pattern categories and associates one or more cash letters with each assembled group of instruments. A communication link is established between the first location and the collecting and clearing bank which reports to the collecting and clearing bank information in the cash letters in anticipation of a deposit in the payee's account corresponding to the cash letter.

The present invention also includes a transport means which delivers groups of instruments and the one or more cash letters from the first location into the check payment system. A central processing unit and communication link predetermines the timing and monitors the transport of the sorted checks. The processing unit also coordinates the checks' deposit with the collecting and clearing bank in a sequence coordinated with the timing of a settlement of accounts in the check payment system. The invention includes alternative embodiments involving a bank of first deposit and a bank of second deposit.

These and further objects of the invention will be more readily understood with reference to the following description of the preferred embodiment taken in conjunction with the figures in which:

DESCRIPTION OF THE PREFERRED EMBODIMENT

In brief a system is provided which structures the processing mechanisms for checks to expedite (1) the processing of checks; (2) the submission of the checks for payment into the check payment system and (3) the deposit of funds represented by the checks into a depositor's account.

In the system, a check payee that receives a large number of checks drawn on numerous different banks, will, at the instruction of the payee's depository bank (i.e., its bank of first deposit), upon processing the checks in its own accounting records (such as by recording a payment to a customer's account) sort the checks according to MICR (Magnetic Ink Character Recognition) data, including routing transit number. The sort by MICR data may be in a sort pattern determined by volume in a predetermined geographic area, the financial institution(s) on which the checks were drawn, or the geographic or commercial area of a bank that will otherwise accept a check for clearing and collection.

In addition to sorting received checks, the payee indorses the check for its own account, and on behalf of its depository bank, which is the bank of first deposit to which the physical check would be otherwise delivered. An institutional indorsement is conventionally applied as a stamp that prints payment instructions and the identity of the indorser on the reverse side of a check. The bank of first deposit is an agent for its depositor and assumes liability for obtaining payment of the check in subsequent processing.

Following sorting and indorsement, the payee then delivers the checks on behalf of the bank of first deposit into the check payment system along with a cash letter in the name of the bank of first deposit, where the checks are cleared and returned to the check writer's bank for ultimate payment against funds in the check writer's account, and the check writer's account is appropriately debited. The "check payment system" includes clearing institutions such as the Federal Reserve Banks, correspondent banks, The National Clearinghouse Association (described in U.S. Pat. No. 5,265,007) and like mechanisms. By reason of its direct relationship to the check payment system, the collecting and clearing bank is a part of the check payment system. In the following two examples, the legend box appearing at the bottom right corners of both FIGS. 1 and 2, indicates that physical transfers are denoted by a solid line and electronic transfers are denoted by a dashed line.

EXAMPLE 1

Figure 1:
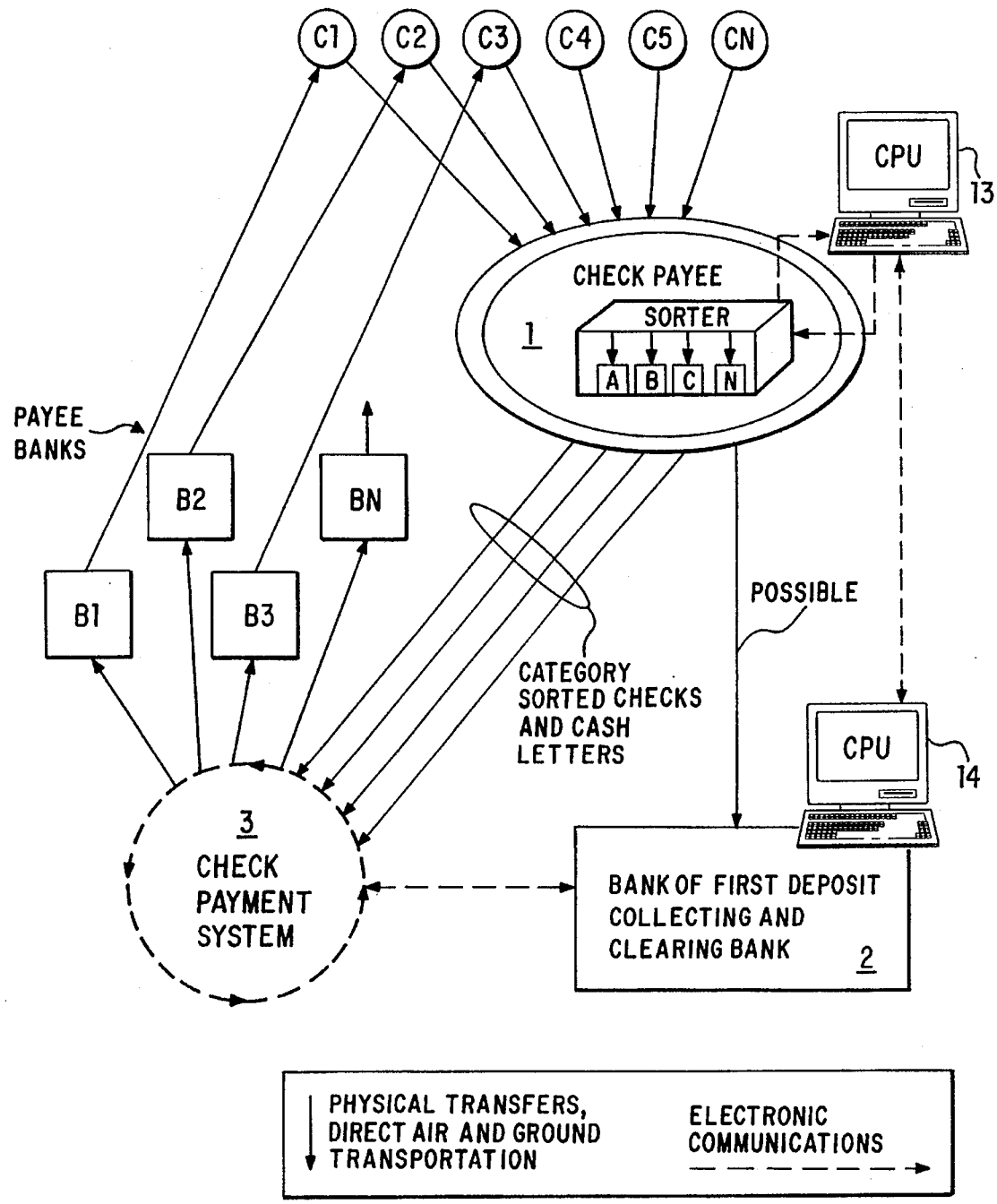
FIG. 1 is a diagram showing the physical transport of checks from the payee into the check payment system, the processing of the checks for collection and deposit, and the ultimate payment from the account of the check writer, as such activities are coordinated by processing means at locations of the check payee and the depository bank.

The system is illustrated in FIG. 1 in which the check payee and bank customer 1 may be a public utility such as a telephone company. In this example, the "bank customer" is a banking client of the bank of first deposit, and is referred to as the "check payee". Typically such a utility will receive from its customers, C1, C2, C3, C4, C5, CN, etc., tens of thousands, if not hundreds of thousands, or millions, of checks per month, drawn on numerous different banks, savings and loans, credit unions or other checking account providers.

In the prior art, once the utility processed and indorsed these checks to reconcile its own and its customer's accounts, the utility would physically transport to and deposit the indorsed checks with its depository bank 2 where the utility maintained an account. The depository bank in turn would credit the utility's account for the checks, and the depository bank, being the bank of first deposit, would separately indorse the checks on its own behalf and collect the checks though the check payment system 3, which leads to the ultimate payment of the check from the check writer's account at banks B1, B2, B3 or BN.

In that process, the bank of first deposit would physically sort the checks received from and deposited by the utility. Check sorting by MICR codes, the addition of the check amount to the MICR line, and other facets of check processing, including MICR code sorting by routing transit numbers, and the use of sorter machines, are known. The sorted checks would then be delivered in a cash letter (i.e., a listing of checks and the amounts of the checks drawn on a particular institution or group of institutions from a particular area) into the check payment system where settlements with other financial institutions on which the checks were drawn would be effected. Such a settlement involves the physical transport and exchange of the checks, and a calculation of aggregate amounts owing and payable by participants in either a bi-lateral or multi-lateral settlement at a predetermined time. After settlement, the check payor's bank would physically have custody of the check and would conventionally process the check for its customer's account.

In contrast, the present system provides that the utility, in its own processing of the checks, at a site distant from the location of the depository bank, indorses the check for payment (1) on its own behalf and (2) on behalf of the bank of first deposit where the utility or check payee 1 maintains an account and deposits the check. In its processing of the checks, the utility adds the check amount to the MICR line.

In the next step, the indorsed checks are sorted by the utility or check payee in accordance with predetermined sort pattern categories selected by the depository institution; and, the utility prepares a cash letter in the name of the depository bank for each group of checks within the predetermined sort category. The sort may be by individual bank, geographic location, clearinghouse affiliation or other criteria determined by the depository bank.

Upon the sorting and preparation of the cash letter, the utility or check payee 1 transmits, between the utility's CPU (Central Processing Unit) 13 and the depository bank's CPU 14, check MICR line information to the depository bank 2 and the bank thus has information for crediting the utility's deposit account for the funds represented by the checks and for other banking purposes with respect to the utility's account. The utility, or check payee 1, however, in lieu of actually transporting the physical checks to the depository bank 2 to make the deposit, as illustrated in FIG. 1 by the solid line with the word "Possible" contiguous thereto, transports the doubly indorsed checks, and accompanying cash letters, for submission directly into the check payment system. The direct submission of the doubly indorsed checks into the check payment system is depicted by the lines connecting payee 1 and check payment system 3 bearing the legend "Category Sorted Checks and Cash Letters".

With reference to the Example, it is evident that improvements in efficiency and time, and a reduction in paper handling is achieved by the system, compared with the instances of physical handling and duplication in the prior art process. The conventional step of delivering the physical items to the bank of first deposit is eliminated; the two indorsements of the check are applied at the same time, instead of twice at the different locations of the payee and the bank of first deposit. The faster availability of funds to all payees in the clearing sequence is achieved. It is necessary, however, that the timing of steps in the present system be synchronized and coordinated between the depositor, the bank and the check payment system with respect to the indorsing and sorting of checks, the transmission of check MICR information, the submission of doubly indorsed checks into the payment system, and the deposit, collection and verification of funds represented by the checks.

EXAMPLE 2

Figure 2:
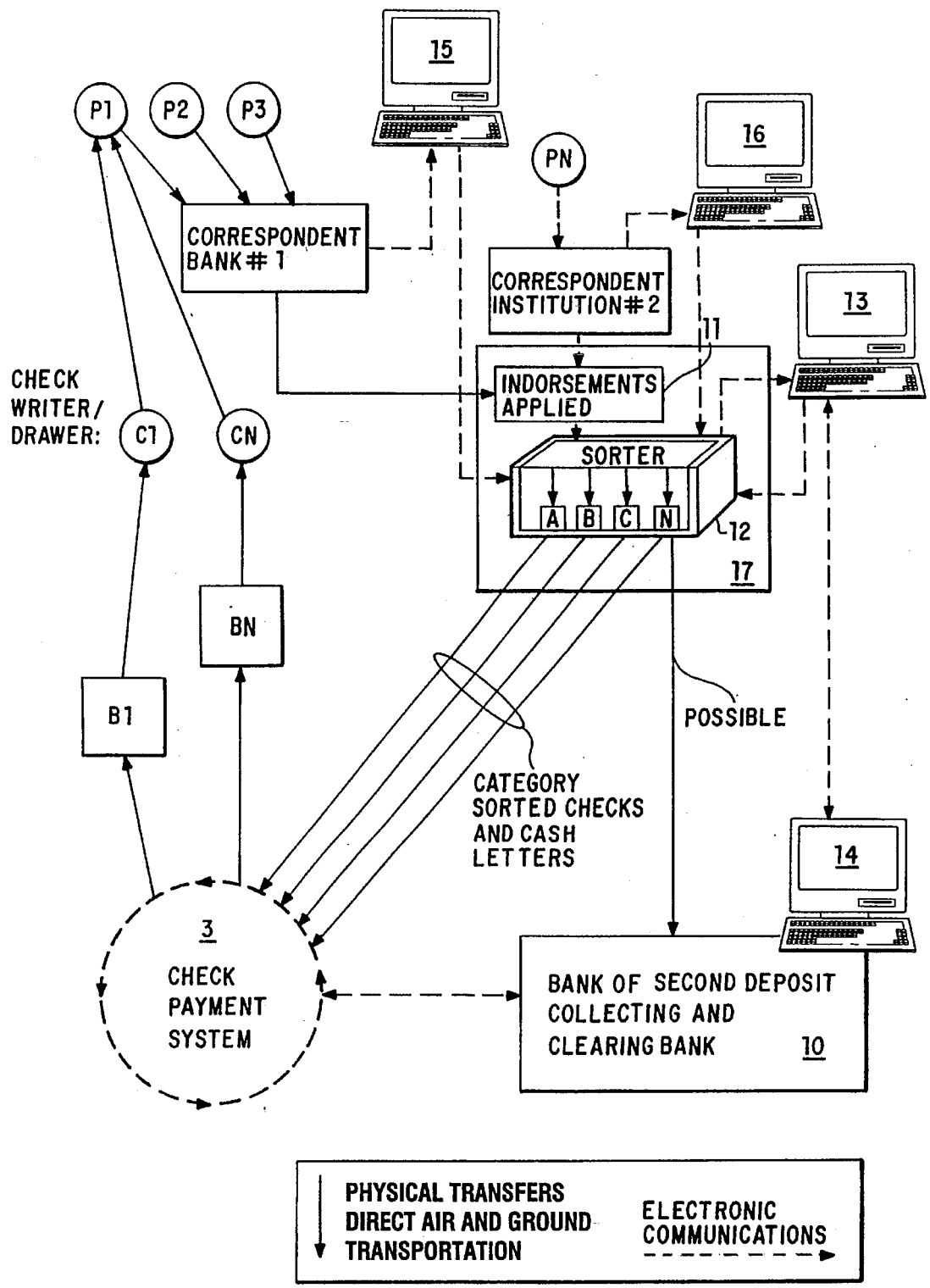
FIG. 2 depicts an alternate system useful in correspondent banking relationships.

An alternative utilization of the invention is shown in FIG. 2, where a collecting and clearing bank 10 is a provider of check processing services to other correspondent banks or financial institutions, correspondent Bank #1, correspondent Institution #2, etc. Here, however, correspondent Bank #1 and correspondent Institution #2 receive, as the institutions of first deposit, checks received from their customers P1, P2, P3, PN, the payees of checks written by check writers/drawers C1, C2, C3, C4, C5, CN. Bank 10 is a bank of subsequent deposit that further submits the checks received from the correspondent banks and institutions into the check payment system for collection and clearing. This example is an illustration of the present invention whereby multiple smaller institutions that do not process the volume of instruments as a check payee 1, such as in Example 1, or larger institutions that typically outsource certain functions, may achieve the advantages of the invention through their utilization of a bank of second deposit, collecting and clearing bank 10.

At a location 17 remote from collecting and clearing bank 10, the checks from the customers of correspondent Bank #1, correspondent Institution #2, etc. are indorsed respectively in the names of correspondent Bank #1, correspondent Institution #2, etc. by indorser 11, on their own behalf as the bank or institution of first deposit. An indorsement is also applied to the checks by the indorser on behalf of bank of second deposit 10. The check amount is added to the MICR line. (The addition of check amount and indorsement information to the check are known elements of the check processing routine). CPUs 15 and 16 associated with correspondent Bank #1 and correspondent Institution #2 respectively, provide a communication link with the remote location whereby check and settlement information available to the sorter of the bank of second deposit is exchanged. At the remote location, the indorsed checks are commingled and sorted by sorter 12 in accordance with predetermined sort pattern categories determined by bank of second deposit 10 and a cash letter is prepared in the name of bank 10 for each group of checks within the predetermined sort category. Information about the checks is transmitted from the indorsement and sorting site to bank 10 via CPUs 13 and 14 respectively, for use in bank 10's recording of the deposit of the checks in the respective accounts of correspondent Bank #1, correspondent Institution #2, etc., maintained at bank 10.

From the sorter site, the cash letter is delivered directly into the check payment system. Although the bank 10 is the collecting and clearing bank for the checks of Bank #1, Institution #2, etc., the physical checks are not handled by bank 10. Instead, the check deposits, clearings and collections are monitored by electronic communication links and CPUs 13 and 14 at the locations of the indorsement applier 11 and sorter 12 and collecting and clearing bank 10.

The preparation of the cash letters for the sorted checks that are delivered from the sorter directly into the check payment system is in accordance with sort pattern criteria determined by the bank of subsequent deposit for collecting and clearing.

Thus, the controlled system described herein accelerates the check collection process by eliminating the need for, and the time consumed by, the physical transport of checks to the depository bank and the subsequent physical transport of the checks and submission of checks into the check payment system by the depository, or collecting and clearing bank. In the first example, dual sorting and dual capture of information by both the payee and a bank of first deposit is eliminated. Likewise, the need for repetitive sorting of the same instrument by both the payee bank and the bank of first deposit is also eliminated when the collecting and clearing bank is a bank of second, or subsequent, deposit. The inter-relationship of the depository bank, or the collecting and clearing bank, with the sorter and indorsement applier is effected by electronic communications and a control system of processing computers at one or each of the bank and the sorter. The CPU at that location transmits MICR line data to the collecting and clearing bank. The cash letters for the sorted checks on behalf of the collecting and clearing bank are prepared at the remote customer's or sorter's location. Physical items that formerly required double handling, first by the customer/depositor and then by the collecting and clearing bank are now singly handled at the point of indorsement and sorting. Check handling and preparation for submission to the payment system are thus integrated.

As handling is reduced, redundancy is eliminated, cost is reduced and error caused by the transfer and handling of numerous checks are also reduced. The checks are forwarded to predetermined sort pattern categories in the check payment system according to the sort patterns established by the collecting and clearing bank. Hence, with reference to Example 1 and the local utility, most of the checks received by the utility would likely be drawn on banks in the utility service area, and the clearing of the checks would be effected through the local check payment system. The collecting and clearing bank, in a location other than that of the utility, maintains an electronic link for settlement purposes for participation in that local check payment system.

By contrast, the payee in Example 1 and the indorsement/sort service provider in Example 2 also become the archive on behalf of the collecting and clearing bank for the received checks, as well as for itself; whereby each check received by the payee is microfilmed or imaged and assigned a document identification number. In Example 2, the sorter may also be the archive for Bank #1, Institution #2, etc., that are serviced by the collecting and clearing bank.

Thus, the invention provides a system for effecting the deposit, settlement and submission for collection of funds represented by financial instruments that are received by a payee at a location remote from the payee's depository bank. The instruments are presented for payment to multiple institutions in the check payment system.

A sorter, which is a well known machine in the banking industry, is placed at a first location established by the payee. The sorter receives the tangible financial instruments in high volume from the payee's customers. The sorter sorts the instruments according to predetermined sort pattern categories determined by the depository bank. Indorsements of the instruments on behalf of the payee and the depository bank with respect to each check received are applied by a printer or stamping mechanism before, during or after the sort process. The sorter will generally assemble the sorted instruments into discrete groups with respect to the predetermined sort pattern categories. A cash letter associated with each assembled group of sorted instruments is prepared by the payee on behalf of the depository bank.

A communication link between the payee location and the depository bank enables the payee to report to the bank the information about the checks in the cash letters and permits the bank, upon receipt of the information to anticipate in the bank a deposit in the payee's account corresponding to the cash letter(s). When the bank receives confirmation that it has received credit for the cash letter through the check payment system, it makes the funds available to the payee.

These physical means are coordinated by a central processing unit and communication links between the parties involved in the check payment process. In this manner the timing of the physical transport of the instruments for submission into the check payment system is controlled and the delivery of the sorted checks into the check payment system is confirmed and verified. The recording of the checks as a deposit in the payee's account with the depository bank, or the collecting and clearing bank, is thus coordinated with the timing of the issue of a credit to the bank when a settlement of the accounts represented by the checks is received through the check payment system.

The transport of the groups of instruments and the associated cash letters from the first location to a payment system endpoint is effected by conventional ground or air delivery.

Given the foregoing disclosure, it is evident that the benefits of the expedited clearing and settlement system described herein may be extended and adapted to numerous types of commercial activities in which a volume of checks is received.

What is claimed is:

1. A system for effecting the deposit, settlement and submission into a payment system for collection of funds represented by financial instruments drawn on different institutions that are received by a payee at a first location, said first location determined by the payee remote from the payee's collecting and clearing bank, comprising:

a sorter at said first location established by the payee (1) for receiving the financial instruments and (2) for sorting the instruments according to predetermined sort pattern categories determined by the collecting and clearing bank;

a printer at said first location for applying to the instruments at a time before, during or after sorting of the instruments, a separate indorsement on behalf of each of the payee and the collecting and clearing bank with respect to each instrument received;

the sorter further assembling the sorted instruments with the applied indorsements into discrete groups with respect to the predetermined sort pattern categories;

a means at the first location for preparing one or more cash letters associated with each assembled group of instruments;

a communication link between the first location and the collecting and clearing bank for reporting to the bank information in the cash letters in anticipation of a deposit of funds in the payee's account at the payee's collecting and clearing bank corresponding to the value of the one or more cash letters; transport means for delivering the groups of instruments and the one or more cash letters from the first location to a second location for receipt into the payment system according to parameters determined by the payee's collecting and clearing bank; and a central processing unit and communication link providing a coordination between the payee and the payee's collecting and clearing bank which predetermines the timing and monitors the transport of the sorted instruments and the cash letters associated therewith and coordinates the recordation of the deposit of the funds represented by the instruments with the collecting and clearing bank in a sequence coordinated with the timing of a settlement of accounts in the check payment system.

2. The system of claim 1 in which the instrument is a check having an MICR line, and including a printer for further applying information representing the check amount to the MICR line.

3. The system of claim 1 in which the collecting and clearing bank is the bank of first deposit for the payee.

4. The system of claim 2 in which the collecting and clearing bank is the bank of first deposit for the payee.

5. A process for effecting the deposit, settlement and submission into a payment system for collection of funds represented by financial instruments drawn on different institutions and payable to a same payee that are received at a first location remote from the payee's collecting and clearing bank, comprising receiving the financial instruments at said first location;
sorting the instruments according to predetermined sort pattern categories determined by the payee's collecting and clearing bank;

applying to the instruments at said first location separate indorsements on behalf of each of the payee and the collecting and clearing bank with respect to each instrument received;

assembling at said first location the sorted instruments into discrete groups with respect to the predetermined sort pattern categories corresponding to cash letter specifications determined by the payee's collecting and clearing bank;

preparing at said first location one or more cash letters associated with each assembled group of instruments;

reporting to the collecting and clearing bank information contained in the cash letters in anticipation of a deposit in the payee's account at the collecting and clearing bank corresponding to the value of the cash letter;

delivering the assembled groups of instruments and the one or more cash letters associated therewith from the first location to a second location where they are submitted into the check payment system according to timing and location parameters determined by the collecting and clearing bank; and coordinating the recordation of the deposit of funds represented by the instruments with the collecting and clearing bank in a sequence coordinated with the timing of a settlement of the collecting and clearing bank's account in the check payment system.

6. The process of claim 5 in which the instrument is a check having an MICR line, and including applying information representing the check amount to the MICR line.

7. The process of claim 5 in which the collecting and clearing bank is the bank of first deposit for the payee.

8. The process of claim 6 in which the collecting and clearing bank is the bank of first deposit for the payee.

9. The system of claim 1 including a means for verifying the information in the cash letters prior to the settlement of accounts.

10. The process of claim 5 including verifying information in the cash letters prior to the settlement of accounts.

11. A system for effecting the deposit, settlement and submission into a payment system for collection of funds represented by financial instruments drawn on different institutions that are received by different payees and submitted to a bank of first deposit for submission into a check payment system on behalf of a bank of subsequent deposit comprising:

a sorter at a first location (1) for receiving the financial instruments from one or more banks of first deposit and payees and (2) for sorting the instruments according to predetermined sort pattern categories determined by the bank of subsequent deposit for collecting and clearing;

a means at said first location for applying separate indorsements to the instruments on behalf of each of the one or more banks of first deposit and payees, and the bank of subsequent deposit with respect to each instrument received;

the sorter further assembling the sorted instruments into discrete groups with respect to the predetermined sort pattern categories;

a means for preparing one or more cash letters associated with each assembled group of sorted instruments;

a communication link between the first location and the one or more banks of first deposit and the payee, and the bank of subsequent deposit for reporting to the respective banks and payee information in the cash letters in anticipation of a deposit in the bank of first deposit and payee's account at the bank of subsequent deposit corresponding to the value of the cash letter;

transport means for delivering the groups of instruments and the one or more cash letters from the first location to a second location for introduction into the payment system according to parameters determined by the bank of subsequent deposit; and a control unit interconnecting the banks and predetermining the timing and monitoring the transport of the sorted instruments so as to coordinate the recordation of the deposit of the funds represented by the instruments in the account with the collecting and clearing bank in a sequence coordinated with the timing of settlement in the check payment system.

12. The system of claim 11 in which the instrument is a check having an MICR line, and including a printer for further applying information representing the check amount to the MICR line.

13. The system of claim 11 including a means for verifying the information in the cash letters prior to the settlement of accounts.

14. A process for effecting the deposit, settlement and submission into a payment system for collection of funds represented by financial instruments drawn on different institutions that are received by different payees and submitted to a bank of first deposit for submission into a check payment system on behalf of a bank of subsequent deposit comprising:

receiving the financial instruments at a first location;

sorting the instruments at said first location according to predetermined sort pattern categories determined by the bank of subsequent deposit for collecting and clearing bank;

applying separate indorsements to the instruments at said first location on behalf of each of the bank of first deposit and the bank of subsequent deposit with respect to each instrument received;

assembling the sorted instruments into discrete groups with respect to the predetermined sort pattern categories;

preparing one or more cash letters associated with each assembled group of instruments;

reporting to the respective banks information in the cash letters in anticipation of a deposit of funds in the payee's account at the bank of subsequent deposit corresponding to the value of the cash letters;

delivering the groups of instruments and the one or more cash letters from the first location into the payment system according to parameters determined by the bank of subsequent deposit; and coordinating the deposit of funds represented by the instruments with the accounts of the respective banks and payees at the collecting and clearing bank in a sequence coordinated with the timing of a settlement in the check payment system.

15. The process of claim 14 in which the instrument is a check having an MICR line, and including a printer for further applying information representing the check amount to the MICR line.

16. The process of claim 14 including verifying information in the cash letters prior to the settlement of accounts.

* * * * *

UNITED STATES PATENT AND TRADEMARK OFFICE
CERTIFICATE OF CORRECTION

| | | |
|---|---|---|
| PATENT NO. | : 5,583,759 | |
| APPLICATION NO. | : 08/507856 | |
| DATED | : December 10, 1996 | |
| INVENTOR(S) | : Terry L. Geer | |

It is certified that error appears in the above-identified patent and that said Letters Patent is hereby corrected as shown below:

At column 6, line 19, delete "itself;" and insert --itself,-- therefor.

At column 7, lines 34-39, indent the lines reciting "transport means for delivering the groups of instruments and the one or more cash letters from the first location to a second location for receipt into the payment system according to parameters determined by the payee's collecting and clearing bank; and" as a separate subparagraph.

At column 7, lines 65-67, indent the lines reciting "sorting the instruments according to predetermined sort pattern categories determined by the payee's collecting and clearing bank;" as a paragraph to be lined up with the immediately preceding paragraph.

Signed and Sealed this

Seventeenth Day of April, 2007

JON W. DUDAS
*Director of the United States Patent and Trademark Office*

EX PARTE REEXAMINATION CERTIFICATE (6161st)
United States Patent
Geer

(10) Number: US 5,583,759 C1
(45) Certificate Issued: Mar. 25, 2008

(54) MECHANISM FOR EXPEDITING THE DEPOSIT, TRANSPORT AND SUBMISSION OF CHECKS INTO THE PAYMENT SYSTEM

(75) Inventor: Terry L. Geer, Baltimore, OH (US)

(73) Assignee: Datatreasury Corporation, Plano, TX (US)

Reexamination Request:
No. 90/008,671, May 31, 2007

Reexamination Certificate for:
| | |
|---|---|
| Patent No.: | 5,583,759 |
| Issued: | Dec. 10, 1996 |
| Appl. No.: | 08/507,856 |
| Filed: | Jul. 27, 1995 |

Certificate of Correction issued Apr. 17, 2007.

Related U.S. Application Data

(63) Continuation of application No. 08/156,190, filed on Nov. 22, 1993, now abandoned.

(51) Int. Cl.
*G06Q 40/00* (2006.01)
*G06F 17/00* (2006.01)

(52) U.S. Cl. .................................... 705/45; 705/30
(58) Field of Classification Search .................. None
See application file for complete search history.

(56) References Cited

U.S. PATENT DOCUMENTS 4,264,808 A    4/1981    Owens et al.

OTHER PUBLICATIONS

Uniform Commercial Code (U.C.C.), 1990 Revision, §§ 3–204, 3–401, 3–402, 4–101–Official Comment 2, 4–103, 4–206.

*Primary Examiner*—Peter C. English

(57) ABSTRACT

A mechanism and process for effecting the expedited deposit, settlement and submission into the payment system for collection of funds represented by tangible financial instruments that are received by a payee at a location remote from the payee's collecting and clearing bank in which the instruments are sorted at a first location where indorsements on behalf of the payee and the collecting and clearing bank are applied, cash letters are prepared according to predetermined criteria, the sorted instruments and the cash letters are delivered into the check payment system and the checks' deposit with the collecting and clearing bank is coordinated with the timing of a settlement of accounts in the check payment system.

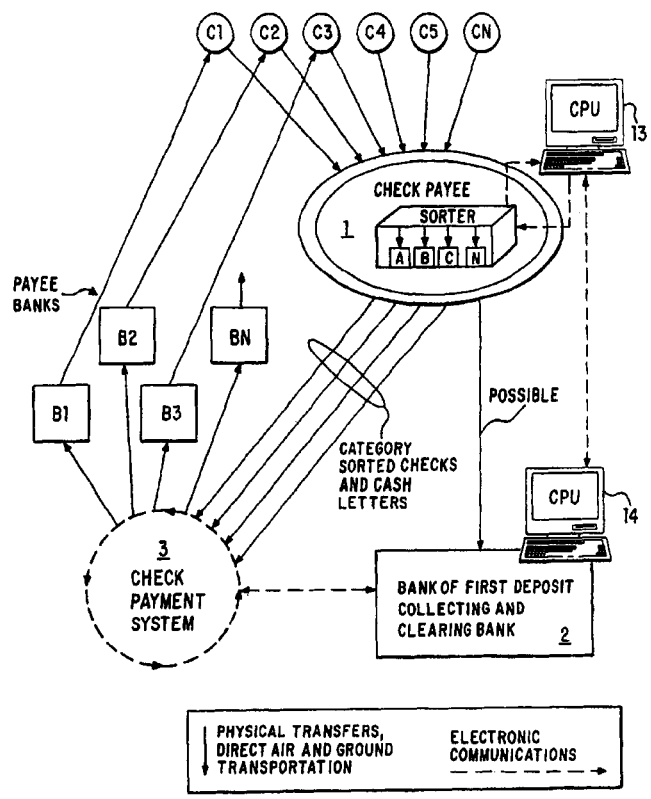

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3 and 11 is confirmed.

Claims 2, 4–10 and 12–16 were not reexamined.

\* \* \* \* \*